United States Patent
McLeod et al.

(10) Patent No.: US 6,777,520 B2
(45) Date of Patent: Aug. 17, 2004

(54) HIGH DENSITY POLYETHYLENE BARRIER GRADE RESINS AND FILMS, METHODS FOR MAKING SAME

(75) Inventors: Michael McLeod, Seabrook, TX (US); Nguong van Nguyen, Pas, TX (US)

(73) Assignee: Fina Technology, Inc., Houston, TX (US)

( * ) Notice: Subject to any disclaimer, the term of this patent is extended or adjusted under 35 U.S.C. 154(b) by 0 days.

(21) Appl. No.: 09/896,916

(22) Filed: Jun. 29, 2001

(65) Prior Publication Data

US 2002/0042490 A1 Apr. 11, 2002

Related U.S. Application Data

(60) Provisional application No. 60/215,862, filed on Jul. 1, 2000.

(51) Int. Cl.[7] .............................................. C08F 210/02
(52) U.S. Cl. ..................... 526/348.1; 526/352; 526/348
(58) Field of Search ............................... 526/348.1, 352, 526/348

(56) References Cited

U.S. PATENT DOCUMENTS

| 5,710,224 A | 1/1998 | Alt et al. ..................... 526/160 |
| 6,110,549 A | 8/2000 | Hamada et al. ............ 428/35.2 |

FOREIGN PATENT DOCUMENTS

| EP | 0729978 | | 9/1996 |
| WO | WO 96/19527 | * | 6/1996 |
| WO | WO 98/14491 | * | 4/1998 |

* cited by examiner

*Primary Examiner*—Ling-Siu Choi
(74) *Attorney, Agent, or Firm*—Bradley A. Misley

(57) ABSTRACT

High density polyethylene barrier grade films comprising at least one layer of polymer wherein the polymer comprises a density greater than about 0.955 g/cc and a rheological breadth parameter of greater than about 0.22 are disclosed. Methods for producing such films on a film line with a neck height configuration of greater than about 15 inches are disclosed.

11 Claims, 2 Drawing Sheets

HIGH DENSITY POLYETHYLENE BARRIER GRADE RESINS AND FILMS, METHODS FOR MAKING SAME

REFERENCE TO RELATED APPLICATION

This application claims the benefit of U.S. Provisional Application Serial No. 60/215,862, entitled "High Density Polyethylene Resin for Blown Film", filed Jul. 1, 2000.

BACKGROUND OF THE INVENTION

1. Field of the Invention

The present invention relates to high density polyolefin and films, and to methods for producing such resins and films. In another aspect, the present invention relates to barrier grade resins and films wherein the films comprise at least one layer of a linear high density polyethylene (HDPE) having low permeability, and to methods for producing such barrier grade resins and films. In even another aspect the present invention relates to HDPE barrier grade films produced on a film line configured with a neck height of greater than about 15 inches, and to methods of producing films comprising at least one layer of such resins.

2. Description of the Related Art

Having been around since the early 1950's, Ziegler-type polyolefin catalysts, their general methods of making, and subsequent use, are well known in the polymerization art. While much is known about Ziegler-type catalysts, there is a constant search for improvements in their polymer yield, catalyst life, catalyst activity, and in their ability to produce polyolefins having certain properties.

Polyolefins, for example polyethylene or polypropylene, have an extremely wide range of applications which include materials and containers in the form of films, sheets, or hollow articles. Tailoring the properties of polyolefins to fit a desired applicability is constantly ongoing.

When light passes through a sheet or film of polyolefin, scattering can cause the light to deviate from the incident direction. If the scattering is significant enough, it will cause a reduction in the transmitted light and the sample will appear to be hazy. This scattering can be from either surface imperfections which are generally related to low gloss, or from scattering bodies within the sample itself. In the case of polyethylene, the scattering bodies are from the regions of high crystalline polymer which increase as the polymer density increases. Increasing the polymer density is achieved by increasing both the size and quantity of crystalline lamella at the expense of the amorphous polyethylene. Therefore, it is normal to observe a decrease in the clarity of conventional polyethylene blown film as the density of the bulk polymer increases. Additionally, it is normal to observe a decrease in the gloss of the film as the density of the polymer increases.

U.S. Pat. No. 6,110,549, issued Aug. 29, 2000 to Hamiota et al., discloses a sealant resin composition for producing sealant film. The Hamiota resin comprises a high density polyethylene as the main component and a linear low density polyethylene polymerized by use of the metallocene catalyst.

U.S. Pat. No. 6,045,882 issued Apr. 4, 2000 to Sandwort, discloses a multilayer, biaxially stretched, flexible, thermoplastic film comprising at least two surface layers and a core layer disposed there between. Each of the two surface layers comprise a blend of a copolymer of ethylene and a $C_3$–$C_{10}$, α-olefin, and a high density polyethylene.

U.S. Pat. No. 6,027,776 issued Feb. 22, 2000 to Mueller, discloses multilayer films for packaging and administering medical solutions wherein the films comprise improved optical properties. The Mueller films generally include: a) an interior layer of homogeneous ethylene/alpha-olefin copolymer; b) a first exterior layer of a material selected from the group consisting of homopolymer or copolymer of polypropylene, a blend of homopolymer or copolymer of polypropylene and elastomer, high density polyethylene, and copolyester; and c) a second exterior layer of a material selected from the group consisting of polyamide, copolyamide, polyester, copolyester, high density polyethylene, polypropylene, propylene/ethylene copolymer, and polycarbonate.

U.S. Pat. No. 5,852,152, issued Dec. 22, 1998 to Walton et al., discloses a biaxially oriented, heat-shrinkable film-making process and film with improved toughness and extrusion processability. The Walton film comprises a layer of at least one substantially linear ethylene homopolymer or interpolymer, wherein the substantially linear ethylene polymer essentially lacks a measurable "high density" fraction.

In spite of the advancements in the art, barrier grade films comprising at least one layer of a linear high density polyethylene (HDPE) barrier grade resin wherein the polyethylene comprises a narrow rheological breadth parameter, and a narrow molecular weight distribution have not been described.

Furthermore, methods of producing a barrier grade film comprising a layer of a HDPE barrier grade resin wherein the resin comprises a narrow rheological breadth parameter, and a narrow molecular weight, wherein the method comprises blowing a HDPE barrier grade film on a film line using a high stalk configuration have not been described.

Thus, there is a need in the art for films comprising a layer of a linear HDPE barrier grade resin wherein the resin comprises a density greater than about 0.955 g/cc, a narrow rheological breadth parameter of greater than about 0.22, a narrow molecular weight distribution (MWD) of less than about 7.0, and a water vapor transmission rate of less than about 0.60 g.mil/100 $in^2$/day.

There is another need in the art for a method of producing a film comprising a layer a linear HDPE barrier grade resin wherein the resin comprises a density greater than about 0.955 g/cc, a narrow rheological breadth parameter of greater than about 0.22, a narrow molecular weight distribution (MWD) of less than about 7.0, and a water vapor transmission rate of less than about 0.60 g.mil/100 $in^2$/day, wherein the resin is blown on a film line configured with a neck height of greater than about 15 inches.

These and other needs in the art will become apparent to those of skill in the art upon review of this specification, including its drawings and claims.

SUMMARY OF THE INVENTION

It is an object of the present invention to provide barrier grade films comprising a layer of a linear HDPE barrier grade resin wherein the resin comprises a density greater than about 0.955 g/cc, a rheological breadth parameter of greater than about 0.22, a molecular weight distribution (MWD) of less than about 7.0, and a water vapor transmission rate of less than about 0.60 g.mil/100 $in^2$/day.

It is another object of the present invention to provide a method for producing barrier grade films comprising a layer of linear HDPE barrier grade resin wherein the HDPE comprises a density greater than about 0.955 g/cc, a rheological breadth parameter of greater than about 0.22, a molecular weight distribution (MWD) of less than about 7.0, and a water vapor transmission rate of less than about 0.60 g.mil/100 in²/day, wherein the resin is blown on a film line configured with a neck height of greater than about 15 inches.

One embodiment of the present invention is directed to a film comprising a layer of linear HDPE barrier grade resin. Generally the HDPE resin is a polyethylene homopolymer and has a water vapor transmission rate (WVTR) of less than about 0.60 g.mil/100 in²/day. In addition, the HDPE utilized in the films of the invention comprises a rheological breadth parameter "a" of greater than about 0.22, and a narrow molecular weight distribution (MWD) of less than about 7.0.

Another embodiment of the invention is directed to a method for producing a film comprising a layer of HDPE barrier grade resin. The process generally comprises blowing a HDPE resin into a film, wherein the HDPE resin comprises a water vapor transmission rate (WVTR) of less than about 0.60 g.mil/100 in²/day, and the HDPE comprises a rheological breadth parameter "a" of greater than about 0.22, and a narrow molecular weight distribution (MWD) of less than about 7.0. The films of the invention may be produced on any film line, such as, for example, an Alpine film line. Generally the films are blown on a film line configured with a neck height greater than about 15 inches. This is an innovative approach to making a barrier grade resin because conventional barrier grade resins are conventionally run in a no neck configuration.

These and other objects of the present invention will become apparent to those of skill in the art upon review of this specification, including its drawings and claims.

DETAILED DESCRIPTION OF THE INVENTION

Figure 1:
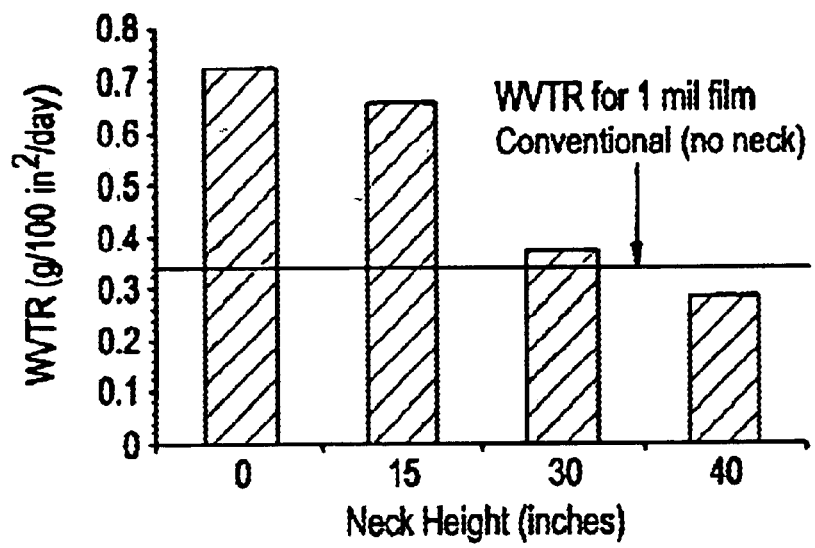
FIG. 1 is graph illustrating the relationship between neck height and water vapor transmission rate (WVTR) for an HDPE resin of the invention having a thickness of 1 mil.

The present invention is directed to high density polyethylene (HDPE) barrier grade resins and films, and methods for producing such barrier grade resins and films. The barrier grade films of the invention may be monolayer films or multilayer films, and are generally produced by being blown on a film line. The barrier grade films of the invention are suitable for use in all applications and/or products requiring a film with low permeability, and high clarity and gloss.

The films of the invention comprise at least one layer comprising HDPE resin. The HDPE resin comprises medium molecular weight HDPE (MMW-HDPE) homopolymer having a narrow molecular weight distribution (MWD), a highly linear backbone, low shear thinning behavior and low permeability.

Generally the HDPE resins useful in the films and methods of the present invention have a MWD of less than about 7.0, preferably less than about 6.5, more preferably less than about 6.0. The HDPE resins useful in the present invention have a density generally greater than about 0.955 g/cc. The MI2 melt index of the resins useful in the present invention is generally in the range of about 0.5 dg/min to about 5.0 dg/min, more preferably in the range of about 0.9 dg/min to about 3.0 dg/min, and most preferably in the range of about 1.0 dg/min to about 2.5 dg/min.

The HDPE resins useful in the invention are stable upon extrusion and have a greater rheological breadth parameter "a" than conventional HDPE resins. Thus, it is preferred that the virgin resins used herein have an extremely low level of catalyst residues in order to avoid degradation upon extrusion. For resins with no differences in levels of long chain branching (LCB), it has been observed that the rheological breadth parameter "a" is inversely proportional to the breadth of the molecular weight distribution. Similarly, for samples which have no differences in the molecular weight distribution, the breadth parameter "a" has been found to be inversely proportional to the level of long chain branching. An increase in the rheological breadth of a resin is therefore seen as a decrease in the breadth parameter "a" value for that resin. This correlation is a consequence of the changes in the relaxation time distribution accompanying those changes in molecular architecture.

Generally the HDPE resins utilized herein have a rheological breadth parameter "a" of greater than about 0.22, preferably greater than about 0.25, more preferably greater than about 0.30, and most preferably greater than about 0.33.

The barrier grade films of the invention comprise a layer of barrier grade HDPE resin of low permeability. Generally the water vapor transmission rate (WVTR) of said HDPE resin layer is less than about 0.60 g.mil/100 in²/day, preferably less than about 0.50 g.mil/100 in²/day, more preferably less than about 0.45 g.mil/100 in²/day, and most preferably less than about 0.40 g.mil/100 in²/day.

The barrier grade resins of the invention generally have better clarity than conventional barrier grade resin. The haze value of the HDPE barrier grade resins of the invention is generally no greater than about 50%, preferably no greater than about 45%, more preferably no greater than about 40%. The gloss of the HDPE barrier grade resins of the invention is generally better than that of conventional barrier grade resins. The gloss of the barrier grade resins of the invention is generally greater than about 5%, preferably greater about 10%, more preferably greater than about 15%.

Generally the thickness of the HDPE resin of the invention is generally up to about 5.0 mil, and are preferably of a thickness in the range of about 0.1 mil to about 2.0 mil.

The films of the present invention may be single layer or multilayered films. For multilayered films of the invention, the polymers employed in the additional layers may be selected from any of the polymeric materials known in the art to be useful in producing films. Thus, for a multilayered film of the invention, the polymers of the additional layers need not be limited to polymers of ethylene but could be any homopolymer or copolymer known in the art such as, propylene-butene copolymer, poly(butene-1), styrene-acrylonitrile resin, acrylonitrile-butadiene-styrene resin, polypropylene, ethylene vinyl acetate resin, polyvinylchloride resin, poly(4-methyl-1-pentene), any low density polyethylene polymer, and the like. Multilayer films of the invention are formed using techniques and apparatus generally well known in the art, such as, for example co-extrusion, and lamination.

Selection of the polymer for each of the additional layers of the multi-layered barrier grade films of the invention is dependent largely upon the application of the multi-layered film. Thus, for the multilayer films of the invention, the additional layers are selected because of a desired property such as, for example, strength, or stiffness, the layer would contribute to the film.

Generally, the thickness of the films of the present invention are up to about 5.0 mil, preferably in the range of about 0.1 mil to about 2.0 mil.

Another embodiment of the invention is directed to methods for producing a barrier grade blown film. The process generally comprises blowing a composition into a film, wherein the composition comprises HDPE homopolymer of the invention having a water vapor transmission rate (WVTR) of less than about 0.60 g.mil/100 in$^2$/day, a rheological breadth parameter "a" of greater than about 0.22, and a narrow molecular weight distribution (MWD) of less than about 7.0. The films of the invention may be produced on any film line, such as, for example, an Alpine film line.

The films of the invention are made with a neck, thus the film line is used in the configuration known in the art for producing high molecular weight (HMW) HDPE films wherein the neck height is at least about 15 inches. In the art, the phrases "made with a neck" and "made with a stalk" are synonymous. The air ring of the extruder is generally opened wide to increase bubble stability by maintaining a low air velocity. The die gap is kept within the range of about 0.5 mm to about 2.5 mm which is a typical range known in the art.

The barrier grade films of the invention are unique in that they comprise a MMW-HDPE resin and are blown on a film line configured with a neck height generally greater than about 15. This is an innovative approach to making a barrier grade resin because conventional barrier grade resins are run in a no neck configuration. For the films and methods of the present invention, preferably the film line is configured with a neck height of greater than about 15 inches, more preferably greater than about 20 inches, and even more preferably greater than about 25 inches. Two particularly preferred neck heights are about 30 inches and about 40 inches.

Additional processing variables are generally as follows: extruder running at a speed in the range of about 65 rpm to about 150 rpm; zone 1 temperature in the range of about 300° F. of about 400° F.; zone 2 temperature in the range of about 300° F. to about 400° F.; zone 3 temperature in the range of about 300° F. to about 400° F.; die 1 temperature in the range of about 300° F. to about 400° F.; die 2 temperature in the range of about 300° F. to about 400° F.; die 3 temperature in the range of about 300° F. to about 400° F.

Other extruders known in the art, such as for example, Kiefel, Gloucester, Reifenhauser, Macchi, CMG, and other equivalent blown film extruders, are also applicable herein for producing the films of the invention.

As is known in the art for improving processability of a polymer, a processing aid such as, for example, Viton GB, Viton SC, Dynamar FX9613, FX5911, any fluoroelastomer, any fluoropolymer, and any of the other equivalent materials known by one of skill in the art, may be blended with any of the one or more polymers used herein. Such processing aids and specifications of their use are known in the art.

In some applications it may be desirable to include a slip/anti-block agent in any of the one or more polymer layers of the present films, particularly for layers produced from polymers having a density of less than about 0.925 g/cc. Generally such materials are inorganic compounds and include, for example, mica, talc, silica, calcium carbonate, and the like.

The resins of the films of the invention may comprise various other processing additives known in the art such as, heat stabilizers, weather stabilizers, lubricants, etc, in amounts that do not impact unduly on the objects of the present invention. These processing aids and the specifications of using such aids are well known in the art.

For co-extrusion methods, it is within the scope of the present invention to blend the HDPE of the invention with other polymers, so long as the amount of the other polymers does not unduly detract from the beneficial properties such as, low permeability, high gloss, low haze, and good processability, of the HDPE of the invention. Generally, the HDPE of the invention is greater than about 50 weight percent of the polymer blend, more typically at least 75 weight percent of the polymer blend, and still more preferably at least about 90 weight percent of the polymer blend.

EXAMPLES

The invention having been generally described, the following examples are provided merely to illustrate certain embodiments of the invention. It is understood that the examples are given by way of illustration and are not intended to limit the specification or the claims to follow in any manner.

The properties of the HDPE polymer and films of the invention provided herein were obtained using methods known in the art as follows:

Molecular Weight and Polydispersity (MWD)

The molecular weights $M_w$ and $M_n$ and the resultant polydispersity (MWD=$M_w/M_n$) were measured by gel permeation chromatography (GPC).

Density

The density was determined in accordance with ASTM D1505 or ASTM D792.

Rheological Breadth Parameter

The rheological breadth parameter is a function of the relaxation time distribution of the resin, which in turn is a function of a resin's molecular architecture. The breadth parameter is experimentally determined assuming Cox-Merz rule by fitting flow curves generated using linear-viscoelastic dynamic oscillatory frequency sweep experiments with a modified Carreau-Yasuda (CY) model, $$\eta = \eta_o[1+(\lambda\gamma)a]^{n-1/a} \qquad (1)$$

where $\eta$=viscosity (Pa s)

$\gamma$=shear rate (1/s)

a=rheological breadth parameter [CY model parameter which describes the breadth of the transition region between Newtonian and power law behavior]

$\lambda$=relaxation time sec [CY model parameter which describes the location in time of the transition region]

$\eta_o$=zero shear viscosity (Pa s) [CY model parameter which defines the Newtonian plateau]

n =power law constant [CY model parameter which defines the final slope of the high shear rate region].

To facilitate model fitting, the power law constant (n) is held to a constant value (n=0). Experiments were carried out using a parallel plate geometry and strains within the linear viscoelastic regime over a frequency range of 0.1 to 316.2 sec$^{-1}$. Frequency sweeps were performed at three temperatures (170° C., 200° C. and 230° C.) and the data was shifted to form a mastercurve at 190° C. using known time-temperature superposition methods.

Melt Index, Haze and Gloss

The melt index was determined in accordance with ASTM D1238; haze was measured in accordance with ASTM D1003; and gloss was measured in accordance with ASTM D-2457-70.

Water Vapor Transmission Rate

The WVTR was determined in accordance with ASTM E96.

Example 1
Production of a Barrier Film of the Invention

HDPE having a density of about 0.96, an MI2 of about 1.2, and SR2 (HLMI/MI2) of about 28, visual FEN of about 3 to 3.5 and good visual structure was used to produce a film of the invention.

The polymer was run on an Alpine Heavy Duty 50 mm extruder HS 50R/HM. This extruder has a grooved feedthroat extruder with a maximum throughput in excess of 200 lbs/hr. Attached to the die is a single lip air ring which has a micrometer to accurately measure the gap as the ring is turned. The air ring is attached to a blower (New York Pressure Blower Size 1806 CW UB) and a chiller run at 40° F. The film is taken up on a variable speed winder that can be run from 0 to 420 feet per minute. The Alpine film line was run using the conditions specified in Table 2. The film was made without the use of an internal bubble stabilizer (IBS); they were stable at all neck heights tested. Lot B1280 was used at neck heights of 0, 15, and 30 inches, while lot B1282 was used to make film at a neck height of 40 inches.

The Alpine processing conditions were as follows:

| | |
|---|---|
| Die Gap | 0.9 mm; |
| Neck Height | 0, 15, 30, and 40 inches; |
| Layflat | 22 inches; |
| Blow Up Ratio | 3; |
| Film Thickness | 1.0 mils; |
| Take Away | 40 m/min; |
| Extruder RPM | 100; |
| Zone 1 (° F.) | 345; |
| Zone 2 (° F.) | 340; |
| Zone 3 (° F.) | 340; |
| Die 1 (° F.) | 340; |
| Die 2 (° F.) | 340; and |
| Die 3 (° F.) | 340. |

The low processing temperatures did not cause melt fracture or any other processing problems. Because the polymer contains Viton GB, it is possible to process at very low temperatures to improve melt strength and maximize bubble stability. The pressures, melt temperature, and amps used were: melt temperature of 357° F., pressure 1 (before the screen pack) of 6200 psi; pressure 2 (after the screen pack) of 3470 psi; and drive amps of 34.

Example 2
Properties of Films Produced in Example 1

FIG. 1 depicts the WVTR of films produced from the HDPE of Example 1 wherein the films were blown on a film line with neck heights of 0, 15, 30, and 40 inches. The horizontal solid black line is used to show the WVTR of a conventional barrier grade film of equivalent thickness produced on a film line by the conventional in the pocket (i.e., no neck) method.

Figure 2:
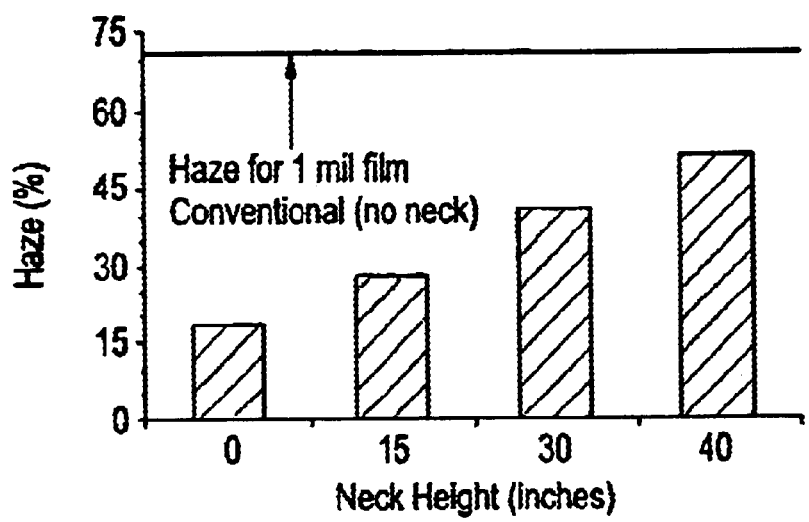
FIG. 2 illustrates the relationship between neck height and haze for an HDPE resin of the invention having a thickness of 1 mil.

FIG. 2 provides haze property of the films blown in Example 1. The horizontal solid line depicts the haze of a conventional barrier grade film of equivalent thickness produced on a film line by the conventional in the pocket (i.e., no neck) method. As clearly seen in FIG. 2, the haze values of the films of the invention are significantly less than conventional barrier grade film.

Figure 3:
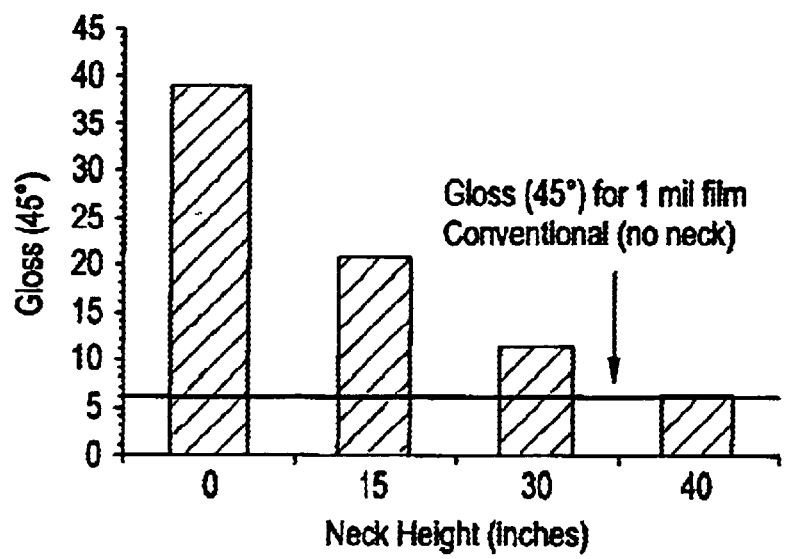
FIG. 3 illustrates the relationship between neck height and gloss for an HDPE resin of the invention having a thickness of 1 mil.

FIG. 3 provide the gloss property of the films blown in Example 1. The horizontal solid line depicts the gloss of a conventional barrier grade film of equivalent thickness produced on a film line by the conventional in the pocket (i.e., no neck) method. As seen in FIGS. 1 and 3, the film produced in Example 1 using a neck height of 40 inches provides a barrier grade film having WVTR and gloss less than (i.e, better than) that of a conventional barrier grade film.

Example 3
Carreau-Yasuda Parameters and Activation Energy for Example HDPE Useful in the Invention Table 1 provides Carreau-Yasuda parameters and activation energy for four different HDPE resins useful in the invention (HDPE 1, HDPE 2, HDPE 3, and HDPE 4) and one conventional HDPE resin (Conv.).

TABLE 1

Carreau-Yasuda Parameters and Activation Energy for HDPE Resins of the invention.

| HDPE Resin | Zero Shear Viscosity (Pa/sec) | Relaxation Time (sec) | "a" Breadth Parameter | Power Law Index | Activation Energy (kj/mol) |
|---|---|---|---|---|---|
| Conv. | 3.00E+04 | 1.08E−02 | 0.224 | 0 | 26.71 |
| HDPE 1 | 7.95E+03 | 6.76E−03 | 0.393 | 0 | 26.90 |
| HDPE 2 | 1.17E+−4 | 7.67E−03 | 0.332 | 0 | 27.61 |
| HDPE 3 | 9.94E+03 | 6.445E−03 | 0.338 | 0 | 26.26 |
| HDPE 4 | 1.01E+04 | 6.667E−03 | 0.339 | 0 | 27.35 |

Example 4
Effect of Neck Height on WVTR

Figure 4:
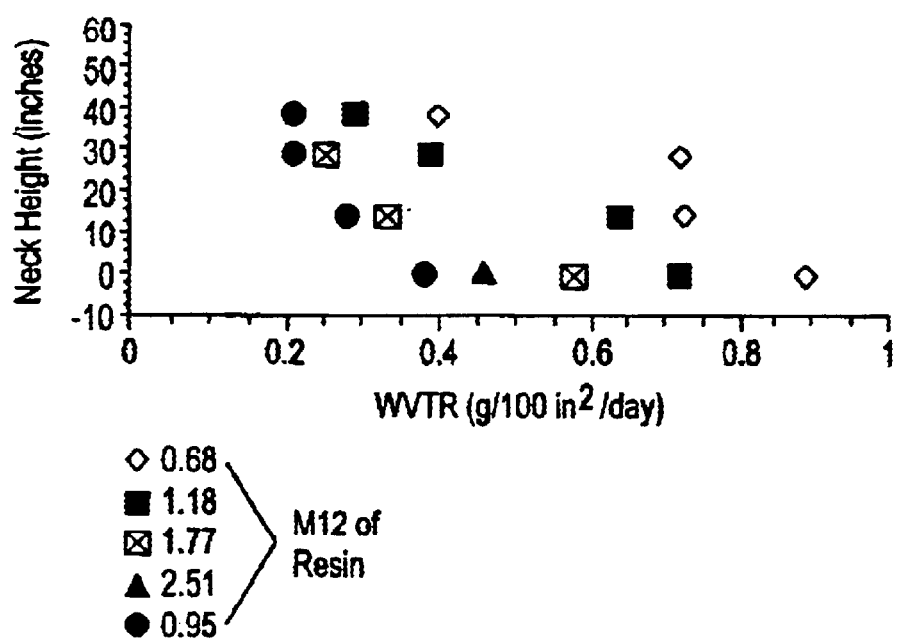
FIG. 4 illustrates the effect of neck height on permeability across a range of melt indices.

FIG. 4 illustrates the usefulness of resins having different melt indices in process the present invention. Films were produced with resins having melt indices (MI2) of 0.68, 1.18, 1.77, 2.51, and 0.95, each at neck heights of 0, 15, 30 and 40 inches. As indicated in FIG. 4, higher neck heights produce a resin with lower permeability and the effect is consistent across a variety of melt indices.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which this invention pertains.

We claim:

1. A process for producing a film, the process comprising the steps of:
   a) blowing a composition on a film line extruder to produce a film,
   wherein said composition comprises a polyethylene homopolymer comprising a density greater than about 0.955 g/cc, and a rheological breadth parameter of greater than about 0.22,
   wherein said film comprises a water vapor transmission rate of less than about 0.60 g mil/100 in$^2$/day, and
   wherein said extruder is configured with a neck height of no less than about 15 inches; and
   wherein the water vapor transmission rate decreases as the processing neck height is increased.

2. The process of claim 1 wherein the neck height is about 15 inches.

3. The process of claim 1 wherein the neck height is about 30 inches.

4. The process of claim 1 wherein the neck height is about 40 inches.

5. The process of claim 1 wherein said polyethylene homopolymer further comprises a molecular weight distribution of less than about 7.0.

6. The process of claim 5 wherein said film is a monolayer film having a thickness of up to about 5.0 mil.

7. The process of claim 6 wherein said film comprises a haze value less than about 50%.

8. The process of claim 7 wherein said film comprises a gloss value of greater than about 5%.

9. The process of claim 1 wherein the composition comprises at least a second type of polymer, and wherein the film is a coextruded blown film.

10. The process of claim 7 wherein the haze value decreases with decreased processing neck height.

11. The process of claim 8 wherein the gloss value decreases with increased processing neck height.

* * * * *